Feb. 28, 1928.
A. A. GRUBB
1,660,504
PYROMETER
Filed Aug. 6, 1925
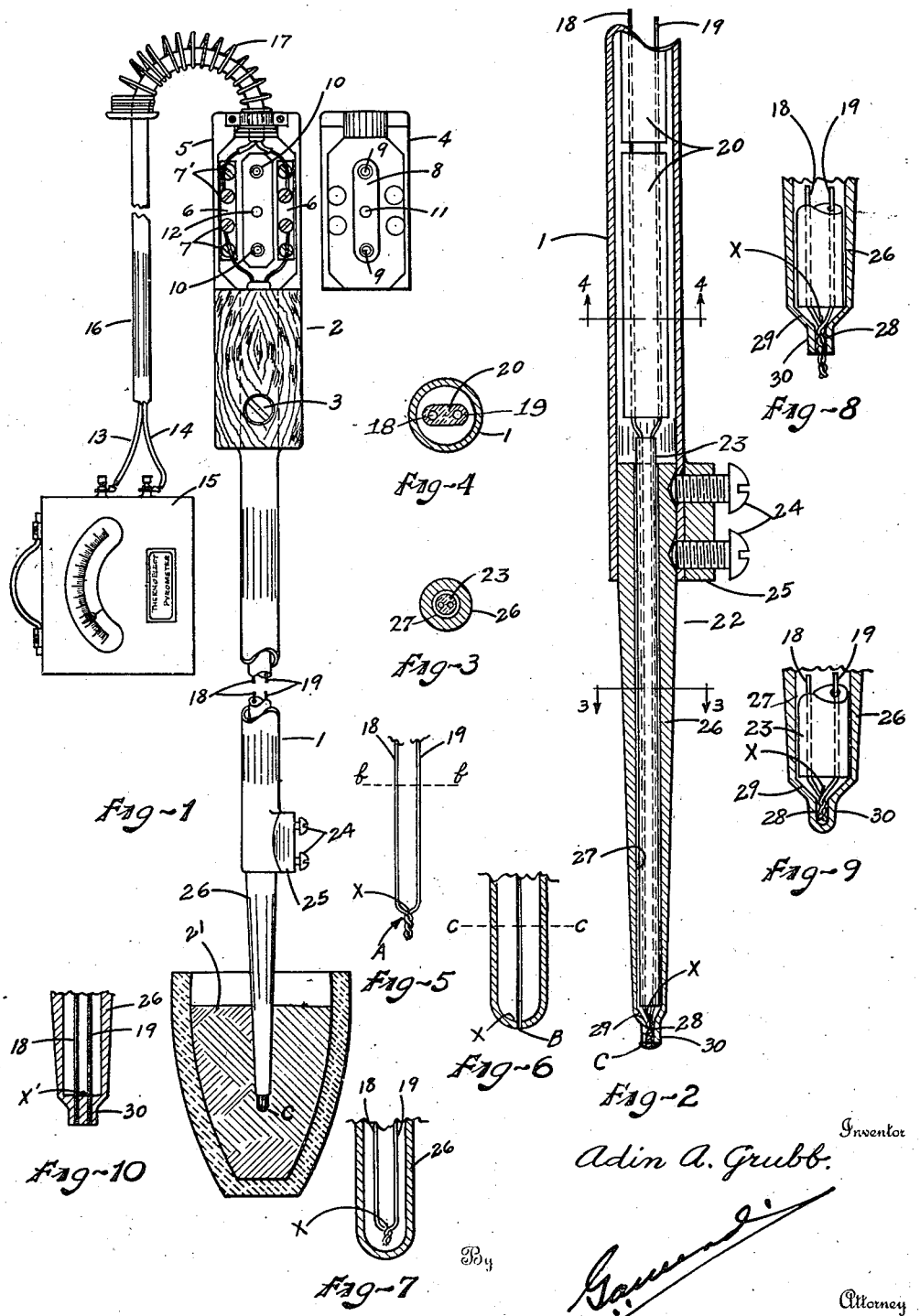
Inventor
Adin A. Grubb.
By
Attorney Patented Feb. 28, 1928.

1,660,504

UNITED STATES PATENT OFFICE.

ADIN A. GRUBB, OF MANSFIELD, OHIO, ASSIGNOR TO THE OHIO BRASS COMPANY, OF MANSFIELD, OHIO, A CORPORATION OF NEW JERSEY.

PYROMETER.

Application filed August 6, 1925. Serial No. 48,481.

My invention relates to improvements in thermo-electric pyrometers and particularly where they are intended for use with molten metal to measure the temperature of the molten mass at its interior.

One of the objects of my invention is to provide a thermo-electric couple whereby the temperature of a liquid mass may be measured below the surface and not at the surface of the mass. Another object of my invention is to protect both elements of the couple beyond their hot junction from contact with the hot liquid.

Another object of my invention is to protect the couple from the corrosive action of gases or liquids. A still further object of my invention is to minimize the temperature lag so that an accurate reading may be secured as quickly as possible and before the temperature to be measured has had an opportunity of changing.

Another object of my invention is to provide a device in which the measurement of temperature is taken at the extreme or "hot" end of the instrument. A still further object of my invention is to provide a construction in which the junction of the couple is intimately subjected to the heat of the mass, the temperature of which is to be measured.

A still further object is to provide a device in which the thermal junction of the elements or the "hot" end is kept as close to the tip of the sheath as possible. A still further object of my invention is to provide a sheath in which the mass at its tip adjacent the "hot" end of the couple is made as small as possible.

Other objects will be disclosed to and recognized by those skilled in the art as I further describe my invention which resides in the new and novel construction, combination and relation of the various parts hereinafter fully described and disclosed in the accompanying drawing.

In the drawing:

Fig. 1 shows my invention and the method of application in measuring the temperature of a pot of molten metal which is shown in section.

Fig. 2 is an enlargement of the "hot" end of the instrument so as to better disclose the details of the protecting sheath.

Figs. 3 and 4 are sections on the lines 3—3 and 4—4 of Fig. 2.

Fig. 5 represents the "hot" end of an unprotected couple.

Fig. 6 represents the "hot" end of a semi-protected couple with which the trade is now familiar in which one element of the couple is the outer tube closed at one end and the other element constitutes a wire extending through the tube and having its end embedded in the closed end of the tube.

Fig. 7 represents the "hot" end of a protected couple.

Figs. 8, 9 and 10 are modified tips from that shown in Fig. 2.

I have found in my experience with the use of and experiment with various pyrometers for measuring the temperatures of molten metal that the open couple shown in Fig. 5 or the open end couple in which the elements are not joined at A and which are the simplest and cheapest forms in which the elements may be used are far from satisfactory with which to secure accurate temperature readings of the metal. It is desirable and highly important in measuring the temperature of molten metals that the temperature be secured as quickly as possible at the time desired and that the temperature be secured at the center or the interior portion of the mass, for I find, contrary to the usual belief, that the mass of metal is not of the same temperature throughout and that the temperature of the surface is more than likely to be considerably lower than that of the metal within the mass, and, therefore, it is very important to have a pyrometer by means of which the temperature at the center or interior of the molten mass may be secured quickly and not the temperature at the surface.

As is well known the thermo-electric couple, generally speaking, measures the difference in temperature between the junction of the couple which is called the "hot" end and the opposite end of the couple which is called the "cold" end, therefore, in the open couple shown in Fig. 5 the "hot" end or junction is at A. If such a couple is inserted in a pot of molten metal to the line b—b such that the upper surface of the molten metal coincides with the line b—b, the temperature which the couple will measure may not be the difference between the junction of the couple at A and the "cold" end of the couple, but it will be the difference between the temperature coinciding with points on the line b—b and the "cold" end of the couple. In other words, the "hot" junction has been moved from A to the surface b—b of the metal due to the exposed elements being short circuited by the metal and the temperature which the open couple will measure will be the difference between that of the surface of the metal and the cold end of the couple and not the difference between that of the interior and the "cold" end.

Another difficulty with the unprotected couple is that the elements are usually quite small and hot metal tends to corrode the same quite rapidly and if they are large, the corrosion increases and becomes a heat insulator thus affecting the efficiency and accuracy of the instrument. Another difficulty with the couple shown in Fig. 5 is that the surface of the molten metal is usually covered with a slag or oxidized film and this has a tendency to adhere to the elements and destroy the reliability of the readings.

It is not uncommon to coat the elements of an unprotected couple with a thin layer of refractory material to protect them against corrosion and increase the reliability of their readings and also to insulate the elements from contact with the metal, excepting at their junction A, and to secure a reading at the interior of the mass of metal, but such coatings are very unsatisfactory as they are brittle and very short lived and do not overcome the unreliability of the readings.

Where the semi-protected couple, as represented in Fig. 6, is employed, I find that there is a considerable time lag in securing the proper reading of the metal due largely to the outer element or enclosing tube having a considerable mass and requiring considerable time to bring the same up to the temperature of the molten metal and this time is often sufficient to permit the mass of metal to have changed its temperature considerably. This mass, however, can be reduced and the time-lag of the instrument reduced, but again, this form of couple has its end immersed in the molten metal up to a point corresponding with the line c—c and, therefore, the temperature measured is not the difference between that of the junction B and that of the "cold" end of the couple, but takes into account the temperature at the surface of the metal which is colder than the metal at the point B and which contacts with one element on the line c—c, and when the instrument is used to measure the temperature of a molten copper alloy, the alloy forms a conducting path in parallel with the tube between the points B and c—c and this may affect the reliability of the readings due to changing the electrical characteristics of the couple at the "hot" end. Also, since the casing forms one element of the couple, it is subject to oxidization and corrosion and becomes coated with slag which alters the thermal characteristics of the couple and reduces the reliability of the readings. But, I find the semi-protected type superior to the protected form in some respects, while the protected form is superior to the semi-protected form in other respects.

Fig. 7 shows the "hot" end of a protected couple in which the couple is enclosed in a casing such as iron, porcelain, etc., but the couple is not connected to or in contact with the casing, therefore, the heat which the thermo-electric junction receives is due to convection or radiation or both. If the couple should contact with the sheath it is usually a mere point of contact in which the extreme end of the connected couple accidentally engages the casing. This form of couple is very slow and not applicable to the taking of quick readings as its time lag is great and it is also inaccurate as the end of the couple may, at times, make contact with the sides or end of the casing.

In order to overcome as far as possible the defects which I found in the forms represented in Figs. 5, 6 and 7 I conducted a series of experiments which resulted in the form of pyrometer shown in Figs. 1 and 2 and which I find a great improvement over either of the forms shown in Figs. 5, 6 and 7.

In the preferred embodiment of my invention I employ a tube 1 which is preferably of metal and may be of iron and on the upper end of this tube is positioned a handle 2 of wood or other insulating material which may be round or square or of other shape and which is held in position on the tube 1 by means of a screw 3. The upper half of the wood handle 2 has one portion 4 detachable. The portion 4 and its corresponding portion 5 is hollowed out in order to permit the oppositely disposed contact members 6 to be secured therein. The contact members 6 each comprise a plate of copper or brass which is secured to the wood portion 5 by means of the screws 7 and 7'. The contact strips 6 are shown as spaced and insulated from each other. The part 4, which might be termed the handle cover, is provided with a metal plate 8 secured thereto and provided with projecting dowels 9 which engage the recess 10 in the member 5 in order to hold the two parts against side movement and to further hold the member 4 in position with respect to the member 5 a screw is inserted through the orifice 11 and extending into the orifice 12 on the member 5 thereby preventing removal of the member 4. Projecting from the upper end of the handle 2 are insulated lead wires 13 and 14 which connect to the contact plates 6 and to the indicating instrument 15 which is usually of a millivoltmeter type calibrated in degrees of temperature in place of the milli-volts. The lead wires 13 and 14 are covered with a protecting insulation 16 and at the point they enter the handle 2 are protected by means of a helically wound spring 17 which prevents the wires being bent short and therefore decreasing their life. The leads 13 and 14 may be of the same metal as the thermocouple elements or they may be of copper or other metal, but the former is preferred and these lead wires are secured to the contact strips 6 by means of the screws 7' which also function to secure the wood strips to the member 5.

The thermocouple proper comprises the two elements 18 and 19 and, as is well known, these are of different metals such as platinum-rhodium or chromel-alumel or other dissimilar metals which will give the desired results. The wires forming the couple are positioned within the protecting tube 1 and have one of their ends joined as by twisting or welding, which I call a thermal union, and their other ends secured each to one of the contacts 6 by means of the screws 7. It is necessary to maintain the elements 18 and 19 electrically separated and insulated from each other and from the tube 1, therefore, I position upon the elements 18 and 19 a refractory insulating element 20, which may be of alundum, clay, porcelain, asbestos or other suitable material and shown in section in Fig. 4. These insulating members 20 I have shown as in short lengths as it is easier to manufacture them in short lengths, although they may be formed into a single insulating element and employed with equal efficiency or the insulating element 20 may be made of a plastic material applied within the tube and about the elements 18 and 19 and then hardened.

In order to protect the thermocouple elements 18 and 19 from contact with the molten metal 21 I employ a protecting sheath 22 which may be of any suitable material to meet the requirements. This is preferably made of metal, but it may be made of quartz or other refractory materials which will withstand the conditions. After considerable experimenting with metals of different composition I have found that when the couple is used with alloy metals such as of copper, zinc, etc., that some compositions will dissolve and others corrode or oxidize badly, but I have found that a sheath made of iron having a high content of chromium, (20% to 30% approximately), is susceptible to the least amount of corrosion and dissolution and is satisfactory for general foundry work and will give very satisfactory results when used with copper or copper alloys.

To protect the elements 18 and 19 from contacting with the sheath 22 and to insulate them from each other and from the sheath I employ a single tube 23 of alundum, quartz or other suitable material and provide therein two spaced holes to receive the elements 18 and 19 and a section of which tube is shown in Fig. 3. The sheath 22 is held in position within the protecting tube 1 by means of the screws 24 which pass through the boss 25 which may be welded on the tube 1.

The sheath 22, it will be noted, comprises a shell 26 the outer face of which is tapered and the recess 27 therein has straight or parallel walls. The lower end of the sheath is contracted and provided with a passage 28 only sufficiently large to receive the twisted or welded ends of the elements 18 and 19 therein. It will also be noted that the lower inner surface 29 of the sheath adjacent the end is tapered and this taper facilitates the insertion of the twisted end of the elements into the opening 28. The twisted, or untwisted, end of the thermocouple elements having been inserted through the opening 28, as shown in Fig. 2, are then brought into intimate relation with the end portion 30 of the sheath by welding the exposed ends of the elements to the extreme end of the sheath, as at C, or by compressing or squeezing the walls of the portion 30 into contact with the thermocouple elements, as in Figs. 8 and 9, thereby forming a thermal union between the elements 18, 19 and the tip 30 which electrically connects the elements together or adds to the connection made by twisting or welding, etc.

It will be noted that the walls of the sheath at the lower end thereof are very thin as compared with the walls at the upper end and this is very important as it reduces to a minimum the time lag in securing readings of the molten metal as there is very little mass for the molten metal to heat up at the "hot" end of the elements.

The sheath 22 protects both elements of the couple from contact with the molten material and hence their characteristics are not changed or affected by the hot molten material and, therefore, the readings are dependable as compared with those of other types known to applicant and described above.

The intimate thermal union formed between the elements of the couple and the member 30 either by compression, peening or welding, etc., assures that the thermoelectric junction X of the two elements, which is the point of contact of the two elements nearest the indicator 15 and which point is at the portion 30, will be subjected to and influenced by the heat of the material to be tested and can be submerged to that point below the surface of the molten material desired by the operator and that the heat will be transmitted to the thermo-electric junction X in the shortest time and most efficient manner and with the least errors as the temperature at the surface of the molten mass will not affect the readings.

In Fig. 8 I have shown the "hot" ends of the couple elements as twisted together, inserted into or projecting through the opening 28 in the portion 30 and then the walls of the portion 30 are squeezed or peened into intimate mechanical contact with the elements 18 and 19 forming a thermal union therebetween. This insures the heat, the temperature of which is to be measured being conducted to the thermo-electric junction of the elements with very little time-lag. The walls of the member 30, as in the case of the walls of the member 30 in Fig. 2 are made relatively thin to reduce the mass as much as practical and permit the heat to travel to the thermo-electric junction X of the elements as quickly as possible hence bringing the temperature of the junction of the elements up to that of the "hot" metal in the shortest period of time.

In Fig. 9 is shown a modification in which the hole 28 does not extend entirely through the portion 30, but the elements are brought into intimate mechanical contact with the portion 30 by peening or compressing the walls of the member 30 into close engagement with the elements 18 and 19 or if the melting point of the elements 18 and 19 are sufficiently low as compared with that of the sheath, then the sheath may be heated to the melting point of the elements 18 and 19 and so fused to the walls of the hole 28.

It will be seen that the elements 18 and 19 and the sheath can be quickly renewed and replaced by loosening the screws 7 and 24 and this is an advantage when using the instrument to measure the temperature of molten metal as the sheath 26 is sometimes attacked by the metal after a time. The elements 18 and 19 may be welded to the portion 30 by projecting the elements through the hole 28 and then applying an electric arc or oxy-acetylene flame to the exposed ends and melting them down and into a fused union with the end 30 of the sheath.

By my invention I have protected both elements and the thermo-electric junction X from contact with the molten metal or other material, the temperature of which is to be measured, by the use of a sheath, and I have provided means to keep the elements out of contact with each other and with the sheath excepting at the thermo-electric junction X of the elements. I have made the mass of the sheath at its tip as small as practical and I have made the contact between the ends of the elements themselves and between the elements and tip of the sheath of a very intimate character to quickly conduct and transmit the heat of the molten material or liquid to the thermo-electric junction X of the elements. By such construction I am able to quickly and to a high degree of accuracy measure the temperature of a molten mass at any interior point.

The portion of the elements projecting below the end face of the tip 30 will contact direct with the material to be measured and will form, when new, a thermal union between the couple and the material measured, but this union will decrease in efficiency if the couple is used to measure the temperature of molten metal or corrosive materials and will sluf off, therefore, I do not depend upon the thermal union of the element direct with the material measured, but bring the thermo-electric junction X as close to the end of the tip 30 as possible and make the connection between the couple and the tip as perfect as possible and the tip as small as practical.

In the modification in Fig. 10 the elements 18 and 19 are not directly connected as by twisting, welding, etc., but are each provided with its own passage through the tip 30 which may be squeezed into intimate contact with the elements or the outer ends may be welded to the outer face of the tip 30 or both. In this case the thermo-electric junction is at X' and the intervening portion of the tip 30 forms a part of the junction, but as it is small it does not affect the efficiency or the rapidity of the couple.

There will, of course, be other modifications which will suggest themselves to those skilled in the art and which will fall within the scope of my invention, the materials for instance may differ from those given and the detailed construction, therefore, I do not wish to be limited other than by my claims.

I claim:

1. The combination with a thermo-electric couple of dissimilar metals electrically connected together at one end to form a thermo-electric junction therebetween of a sheath surrounding the elements and secured thereto at thermo-electric junction.

2. The combination with a thermo-electric couple of dissimilar metals mechanically secured together at one end to form a thermo-electric junction therebetween of a sheath surrounding the elements and secured to the couple at the thermo-electric junction and forming a thermal union with the elements.

3. The combination of a thermo-electric couple of two dissimilar elements connected together to form a thermo-electric junction therebetween, a sheath to protect the thermo-electric junction from contact with the material the temperature of which is to be measured and means comprising a portion of the sheath reduced to a very thin section and surrounding and engaging the elements at the junction to efficiently conduct the heat of the material to the thermo-electric junction.

4. The combination with a thermo-electric couple of two dissimilar elements connected together for a short distance at one end to form a thermo-electric junction at one end of said connected portion, of means secured to and enclosing the connected portion of the elements to protect the junction and both elements from contact with the metal and to conduct the heat of the metal to the junction.

5. A thermo-electric couple having a thermo-electric junction and provided with means to protect the couple and the thermo-electric junction from contact with a mass of molten metal when the junction and couple are plunged into and below the surface of the metal and means secured to the elements at the junction to conduct the heat of the metal to the junction.

6. A thermo-couple comprising a pair of elements of dissimilar metal having one end of each element united to form a thermo-electric junction, a sheath to protect the elements and the thermo-electric junction and having means at its tip to receive the said ends of the elements in fused relation to the tip of the sheath.

7. A protecting sheath for a thermo-couple comprising an elongated tubular member having an orifice therethrough of two different diameters to receive the couple, the length of the orifice of larger diameter being greater than that of the smaller diameter and the outside diameter of the wall of the greater diameter orifice being greater than the outside diameter of the wall of the smaller diameter orifice, the wall of the larger diameter portion tapering to a thin section adjacent the smaller diameter portion and the inner surface of the wall of the greater orifice adjacent the smaller orifice tapering to meet the inner surface of the wall of the smaller orifice.

8. A protecting sheath for the hot end of a thermo-couple comprising an elongated member having an orifice therethrough of two diameters to receive the couple, the length of the orifice of the large diameter being greater than that of the smaller diameter and the wall of the larger diameter orifice tapering to a thin section adjacent the hot end of the couple, a reduced portion projecting from the above portion of the sheath and through which passes the reduced orifice, the wall of the reduced portion being of as thin a section as practical to avoid mass.

9. A protecting shath for a thermo-couple comprising a tubular portion having an orifice therethrough to receive the thermo elements in spaced and insulated relation and having means at one end to cooperate with means on a support to secure the sheath to the support, a portion projecting from the first said tubular portion and having a passage therein to receive and securely engage the ends of the thermo elements and grip the same to conduct outside heat direct to the thermo-electric junction of the thermo-couple.

10. A protecting sheath for a thermo-couple comprising an elongated portion having an orifice therethrough to receive the elements of a thermo-couple in spaced and insulated relation to each other and to the sheath, a portion projecting from one end of the elongated portion of reduced diameter and provided with means to receive and grip the ends of the thermo elements at their thermo-electric junction and adapted to grip the said ends.

11. The combination with a pair of dissimilar elements to form a thermo-couple of means to engage the two elements and electrically connect together one end of each element to form at the connection of the elements and said means a thermo-electric junction therebetween and to protect said junction from contact with the material to be tested.

12. The combination with a pair of dissimilar elements to form a thermo-couple of means to engage and to mechanically and electrically secure together one end of each element to form a thermo-electric junction therebetween, to protect the junction from contact with the material to be tested and to conduct heat directly to the thermo-electric junction.

13. The combination with a thermo-electric couple of dissimilar metals having a thermo-electric junction of a sheath to protect the elements and the thermo-electric junction and having means compressed into close mechanical engagement with the end of the couple adjacent the junction.

14. The combination with a thermo-electric couple of dissimilar metals having a thermo-electric junction of a sheath to protect the elements and the thermo-electric junction, the sheath having a materially reduced cross-section compressed into close mechanical engagement with the couple at the junction.

15. The combination with a thermo-couple of two dissimilar elements connected together to form a thermo-electric junction of very thin metallic means securely engaging the elements at the junction to conduct heat directly to the junction and protect the junction and the elements from contact with the material, the temperature of which is to be measured.

16. A thermo-couple comprising a pair of elements of dissimilar metals and having the elements united for a short distance of their length at one end and providing a thermo-electric junction at the inner end of the connected portion intermediate the ends of the elements and means enclosing and protecting the thermo-electric junction and engaging the elements at the thermo-electric junction to conduct heat directly to the thermo-electric junction.

17. A thermo-couple comprising in combination therewith a sheath to protect both elements of the couple from external influences tending to affect the accuracy and reliability of the couple when in use and intimately connected with the elements to electrically connect the elements together to form within the interior of the sheath and at said intimate connection a thermo-electric junction and to quickly and accurately transmit external heat to the thermo-electric junction.

18. A thermo-couple having a thermo-electric junction comprising a pair of elements of dissimilar metals, a protecting sheath therefor provided with metallic means intimately secured to and contacting with the elements at the thermo-electric junction and electrically connecting the elements together.

19. The combination with a thermo-electric couple of two dissimilar metals secured together at one end and diverging from contacting with each other to form a thermo-electric junction therebetween of a sheath surrounding the elements and compressed into engagement with the elements at the thermo-electric junction and forming a thermal union with the elements at the thermo-electric junction and means to maintain the elements beyond the thermo-electric junction electrically separated and out of contact with the sheath.

In testimony whereof I affix my signature.

ADIN A. GRUBB.